(12) United States Patent
Bosi

(10) Patent No.: US 11,067,504 B2
(45) Date of Patent: Jul. 20, 2021

(54) OPTICAL INSPECTION APPARATUS AND METHOD FOR AN EXTRUDER

(71) Applicant: SACMI COOPERATIVA MECCANICI IMOLA SOCIETA' COOPERATIVA, Imola (IT)

(72) Inventor: Gildo Bosi, Bagnacavallo (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 752 days.

(21) Appl. No.: 15/568,984

(22) PCT Filed: May 13, 2016

(86) PCT No.: PCT/IB2016/052781
§ 371 (c)(1),
(2) Date: Oct. 24, 2017

(87) PCT Pub. No.: WO2016/181361
PCT Pub. Date: Nov. 17, 2016

(65) Prior Publication Data
US 2018/0128738 A1 May 10, 2018

(30) Foreign Application Priority Data
May 13, 2015 (IT) .......................... BO2015A000247

(51) Int. Cl.
*G01N 21/359* (2014.01)
*B29C 48/92* (2019.01)
(Continued)

(52) U.S. Cl.
CPC ......... *G01N 21/359* (2013.01); *B29C 48/832* (2019.02); *B29C 48/92* (2019.02);
(Continued)

(58) Field of Classification Search
CPC ...... G01N 21/359; B29C 48/92; B29C 48/832
See application file for complete search history.

(56) References Cited

U.S. PATENT DOCUMENTS 4,290,986 A   9/1981  Koschmann
5,684,583 A  11/1997  Abe et al.
(Continued)

FOREIGN PATENT DOCUMENTS

CN      104089923 A   10/2014
DE       19820948 C1   9/1999
(Continued)

OTHER PUBLICATIONS

Rohe, T., et al., "Near Infrared (NIR) Spectroscopy for In-Line Monitoring of Polymer Extrusion Processes", Talanta, vol. 50, 1999, pp. 283-290.

*Primary Examiner* — Joseph S Del Sole
*Assistant Examiner* — John Robitaille
(74) *Attorney, Agent, or Firm* — Pearne & Gordon LLP

(57) ABSTRACT

An apparatus (1) for optical inspection of a mass of polymeric material (2) passing through an extruder (3) having a hollow extrusion cylinder (4) extending elongately in a longitudinal direction comprises an optical sensor (8) which can be operatively coupled to the extrusion cylinder (4) and having an infrared light emitter (8a) and a receiver (8b) configured to measure a measurement parameter representing an optical property of the polymeric material (2) inside the extrusion cylinder (4) and is characterized in that it comprises a plurality of the optical sensors (8) which can be operatively coupled to the extrusion cylinder (4) in a plurality of measurement sites located in succession and spaced from each other along the longitudinal direction and a processor (9) programmed to acquire a plurality of measurement signals containing the measurement parameters measured by the corresponding optical sensors (8) and pro-
(Continued)

grammed to process the plurality of measurement signals in order to calculate a corresponding plurality of values of a control parameter indicating a physical state of the polymeric material (2) as a function of a longitudinal position.

12 Claims, 2 Drawing Sheets

(51) Int. Cl.
 *B29C 48/80* (2019.01)
 *G01N 21/35* (2014.01)
(52) U.S. Cl.
 CPC *B29C 2948/922* (2019.02); *B29C 2948/9219* (2019.02); *B29C 2948/9238* (2019.02); *B29C 2948/92219* (2019.02); *B29C 2948/92247* (2019.02); *B29C 2948/92361* (2019.02); *B29C 2948/92409* (2019.02); *B29C 2948/92685* (2019.02); *B29C 2948/92695* (2019.02); *B29C 2948/92704* (2019.02); *B29C 2948/92714* (2019.02); *B29C 2948/92876* (2019.02); *G01N 2021/3595* (2013.01)

(56) References Cited

U.S. PATENT DOCUMENTS

| | | |
|---|---|---|
| 2016/0009014 A1 | 1/2016 | Schmitz |
| 2016/0257038 A1 | 9/2016 | Morgenbesser |

FOREIGN PATENT DOCUMENTS

| | | |
|---|---|---|
| DE | 102013100866 A1 | 7/2014 |
| EP | 0716299 A1 | 6/1996 |
| JP | H0989787 A | 4/1997 |
| WO | 2014183145 A1 | 11/2014 |

OPTICAL INSPECTION APPARATUS AND METHOD FOR AN EXTRUDER

TECHNICAL FIELD

This invention relates to an optical inspection apparatus and method for an extruder. The invention also relates to an extruder.

The invention addresses the plastics industry. More specifically, it is applicable in the field of extrusion of thermoplastic polymeric materials. Thermoplastic polymers soften or melt when heated and return to the solid state when cool.

BACKGROUND ART

Generally speaking, extrusion machines (or extruders) allow obtaining extrudates, that is, objects made of plastic material (typically constant in cross section) of predetermined length, starting from pellets (or granules, for example, small cylinders or discs between 1 and 5 mm in diameter) made of a polymer or polymeric mixture and used as raw material to make the plastic objects.

Extrusion machines are also used in the plastic moulding industry, where an injection mould is located downstream of an extrusion machine to receive melted polymeric material and make a plastic object. Generally, the melted polymeric material is injected into the mould by a pump.

An example of an extrusion machine is described in patent document U.S. Pat. No. 4,290,986. These extrusion machines comprise, for example, a feed hopper through which the pellets of polymeric material are fed into an internally hollow extrusion cylinder, typically elongate and extending in a longitudinal direction. Inside the extrusion cylinder, the pressure and temperature conditions result in melting (in the case of semi-crystalline polymers) or softening (in the case of amorphous polymers) of the pellets of polymeric material.

It should be noted that the term "melted polymeric material" applies to semi-crystalline polymers, whereas in the case of amorphous polymers, the more correct term to be used is "softened polymeric material". Unless otherwise specified, however, the terms "melting" and "softening" are used synonymously in this text.

The extrusion cylinder usually houses an endless screw (or extruder screw) connected to a motor which drives it in rotation about a longitudinal axis. Rotation of the extruder screw in a working direction forces the polymeric material to move from the inlet to the outlet of the extrusion cylinder in a feed direction.

Generally, the extrusion cylinder is heated by heating elements (typically electrical resistors) while the diameter of the core of the extruder screw becomes larger in the feed direction, thus reducing the free space between the extruder screw itself and the inside walls of the extrusion cylinder. This creates, inside the extrusion cylinder, pressure and temperature conditions which cause the polymeric material to melt.

To control the temperature of the extrusion cylinder, the heating elements are, for example, connected to a feedback control system which gradually increases the temperature inside the extrusion cylinder, in the feed direction of the polymeric material, allowing the pellets to melt gradually as they move along the extrusion cylinder, thereby preventing overtemperatures which could lead to degrading of the polymer.

The polymeric material is moved by the extruder screw along the extrusion cylinder until it reaches an outlet zone which comprises a die whose inside diameter is smaller than the inside diameter of the extrusion cylinder, and an outlet hole for the melted polymeric material.

These prior art extrusion machines suffer from some problems, however.

One problem is connected with the degrading of the extruder. For example, prolonged use of the extruder causes wear of the extruder screw (resulting in changes in the extrusion parameters). It should be noted that substituting the extruder screw is particularly complex and costly.

Another problem is that the product fed out of the extruder (extrudate) might not have the required characteristics. More specifically, the quality of the extrudate may be impaired (for example, local defects may appear) by unmelted material that is, pellets of polymeric material which have not melted completely) in the outlet zone of the extruder. The need to inspect the extruded product has been tackled.

The scientific article "*Near infrared (NIR) spectroscopy for in-line monitoring of polymer extrusion processes*" (T. Rohe, W. Becker, S. Kölle, N. Eisenreich, P. Eyerer, Talanta 5, 1999, pages 283-290) describes an inspection system intended to improve control over the quality of the extruded product and, in particular, to analyse the properties of the melted polymeric material in the zone near the outlet of the extrusion cylinder. This solution comprises an infrared spectrophotometer having an infrared light source and a receiver, located on diametrically opposite sides of the extrusion cylinder. More specifically, the light source is configured to emit infrared light and the receiver is configured to measure the emitted light through the melted polymeric material as a function of the wavelength, in order to obtain an absorption spectrum (that is, an infrared spectrum). Analysing the infrared spectrum makes it possible to obtain information on the type of polymeric material processed: for example, on its composition in the proximity of the outlet zone.

Another solution is described in patent document DE19820948, which relates to an extruder equipped with an optical inspection system located downstream of the extruder to monitor the properties and specifications of the extrudate. Other technical solutions are disclosed in patent documents DE102013100866A1, WO2014/183145A1, EP0716299A1, JPH0989787A, CN104089923A.

These optical inspection systems, however, although they allow checking the polymeric material downstream of the extrusion process, do not tackle the problem of extruder wear and do not provide a robust and reliable answer to the problem of guaranteeing the conformity of the extruded product with specifications.

DISCLOSURE OF THE INVENTION

The aim of this disclosure is to provide an optical inspection apparatus and method for an extruder to overcome the above mentioned disadvantages of the prior art.

More specifically, this disclosure provides an optical inspection apparatus and method for an extruder, which allow providing particularly significant information on the operation of the extruder; and which allow obtaining information useful for identifying the causes of possible malfunctions of the extruder and/or of poor product quality.

A further aim of the disclosure is to provide an optical inspection apparatus and method for an extruder which are particularly effective and inexpensive.

A further aim of the disclosure is to provide an extruder which is particularly efficient and reliable.

These aims are fully achieved by the optical inspection apparatus and method according to the disclosure as characterized in the appended claims.

More specifically, the inspection apparatus according to the disclosure is configured to analyse a mass of polymeric material passing through an extruder.

The extruder comprises a hollow extrusion cylinder extending elongately in a longitudinal direction. The extrusion cylinder has an inlet, preferably located at a first end, for receiving pellets of polymeric material, and an outlet, preferably located at a second end, for expelling melted polymeric material.

The extruder comprises an extruder screw located inside the extrusion cylinder. The extruder screw rotates about its (longitudinal) axis. The extrusion cylinder extends elongately along that axis. Preferably, the extruder screw is connected to a motor which drives it in rotation inside the extrusion cylinder to move the polymeric material from the inlet to the outlet.

The extruder comprises a plurality of heaters coupled to the extrusion cylinder to exchange heat therewith.

The optical inspection apparatus according to the disclosure comprises a plurality of optical sensors operatively coupled (that is, able to be coupled to be operatively coupled) to the extrusion cylinder in a plurality of corresponding measurement sites. The measurement sites are located along the longitudinal direction and are spaced from each other. Thus, the measurement sites, which are defined by the positions of the optical sensors coupled to the extrusion cylinder, are located in succession along the longitudinal direction.

This allows simultaneously inspecting zones inside the extrusion cylinder which are located at different longitudinal positions, that is, which are positioned at different distances from the outlet (or from the inlet) of the extrusion cylinder.

At least one (but preferably two or more) optical sensors are coupled to the extruder in a zone surrounding the extrusion screw.

This allows to optically monitor the area surrounding the extrusion screw, in measurement zones positioned at different heights (quotes longitudinally spaced).

In one example embodiment, each optical sensor comprises an emitter and a receiver configured to measure a measurement parameter representing an optical property of the polymeric material inside the extrusion cylinder.

The inspection apparatus according to the disclosure comprises a processor connected to the optical sensors to acquire a plurality of measurement signals containing the measurement parameter measured by the corresponding optical sensors.

The processor is programmed to (configured for) process the measurement signals acquired. More specifically, the processor is programmed to (configured for) process (each of) the measurement signals in order to derive from the measurement parameter a control parameter indicating a physical state of the polymeric material passing through the extruder (that is, processed by the extruder).

In other words, the processor is programmed to (configured for) calculate, from the plurality of measurement signals, a corresponding plurality of values of the control parameter, where each value of the plurality corresponds to a respective measurement site.

It is observed that the various optical sensors located along the extruder are configured to detect all the same measuring parameter, or corresponding measurement parameters, from which to derive the same control parameter indicative of a physical state of the polymeric material passing through the extruder (or processed by the extruder).

The plurality of calculated control parameter values represents a curve of the control parameter as a function of a longitudinal position (in the context of the longitudinal extension of the extruder).

It should be noted that this solution makes it possible to obtain useful information on the operation of the extruder, with reference in particular to the dynamics of plasticization (that is, melting), that is, of the passage of the polymeric material from pellets (solid) to melted polymeric material.

In effect, knowing the changes in the control parameter (representing the physical state, that is, the solid or liquid phase, that is, the viscosity, that is, the softening of the material) along the extruder makes it possible to identify the zone of the extruder's internal space where the transition from pellets (unmelted) to the melted polymeric material occurs.

This solution, whereby the polymeric material can be inspected during the melting process, besides allowing identification of possible extruder malfunctions responsible for poor end product quality (for example, the presence of unmelted material in an outlet zone of the extruder), also allows investigating the causes of the malfunctions.

In other words, this solution allows obtaining information on the progress of the melting process by tracking the physical state of the polymer in the different zones of the extrusion cylinder.

Preferably, the measurement parameter represents a transmittance and/or a reflectance of the polymeric material. The control parameter is preferably also calculated as a function of the amplitude of the measurement parameter, that is, of the intensity of the electromagnetic radiation received by optical sensors.

This is advantageous because research and tests conducted by the Applicant showed that the transparency, that is, transmittance (and/or reflectance) of polymeric material changes when the polymeric material passes from the solid to the melted state.

Emitter and receiver are respectively configured to emit and detect electromagnetic waves whose wavelength falls within a predetermined band (for example, between 700 nm and 1 mm). Preferably, emitter and receiver are respectively configured to emit and detect electromagnetic waves whose wavelength is between 700 nm and 3000 nm). Preferably, the processor is programmed to acquire the measurement signals for a predetermined measurement time interval (or measurement time). The processor is also configured to calculate the control parameter, for each measurement site, as a function of a measurement parameter curve of the corresponding measurement signal in that measurement time.

In that case, preferably, the processor is programmed to calculate the control parameter as a function of a curve, that is, of a ripple, of the measurement parameter in that measurement time.

This makes calculation of the control parameter particularly simple and robust.

For example, the processor is programmed to calculate the control parameter, for each measurement site, as a function of a frequency of variation of the measurement parameter of the corresponding measurement signal from a high reference interval to a low reference interval (in other words, the number of measurement curve peaks in the measurement time is calculated).

In one example, the receiver of the optical sensors defines a bandwidth of less than 100 nm. Also, the receiver of the optical sensors operates at a predetermined wavelength (for example, by means of a photodiode and optical passband filter).

Limiting the bandwidth of the receiver of the optical sensors has the advantage of making them particularly simple, economical and precise.

In effect, it should be noted that for the purposes of calculating the control parameter, it was found (from research and tests conducted by the Applicant) that it is significant to estimate the amplitude of the measurement parameter at a predetermined wavelength rather than estimating the position or wavelength of a peak in an infrared spectrum. Preferably, the optical inspection apparatus comprises, for each optical sensor of the plurality of optical sensors, a filter connected to the optical sensor and adjustable to selectively vary a position (in the wavelength domain) of the receiver bandwidth.

It should be noted that this solution makes it possible to select the bandwidth of the receiver to receive measurement signals of greater amplitude, thus increasing the efficacy and reliability of the inspection apparatus and of the extruder.

In one example embodiment, the processor is configured to receive information relating to the type of polymeric material processed by the extruder. Preferably, the processor is configured to receive information relating to an infrared spectrum of the polymeric material processed by the extruder.

In one example embodiment, the processor is connected to the filters in order to adjust them and is programmed to set, for each optical sensor, the position of the bandwidth in a zone of the infrared spectrum intermediate between (two successive) absorption peaks.

The information relating to the infrared spectrum of the polymeric material processed allows optimizing the choice of the wavelength interval in which to position the operating band of each sensor by means of the filter.

In one example embodiment, the apparatus comprises a scattering spectrophotometer or a Fourier transform spectrophotometer, connected to the processor to transmit information relating to the polymeric material (that is, the information relating to the infrared spectrum of the polymeric material) processed by the extruder.

In one example embodiment, the processor is set up to receive operating parameters relating to the rotation speed of the extruder screw and/or the heating power of the heaters and/or the pressure inside the extrusion cylinder. Preferably, the processor is programmed to generate one or more control signals as a function of the curve of the control parameter relative to the longitudinal position. These are feedback control signals for varying the operating parameters as a function of a reference configuration (that is, a reference curve) of the control parameter inside the extrusion cylinder.

It should be noted that this solution allows optimizing the process of extrusion of the polymeric material. More specifically, varying the operating parameters of the extruder as a function of the control parameter values, makes it possible to prevent unmelted material from reaching the proximity of the outlet of the extrusion cylinder. It is also possible to modify the operating parameters of the extruder to compensate for the effects of extruder screw wear, thus making the extruder more reliable.

A further aim of this description is to provide an extruder for polymeric materials. The extruder comprises a hollow extrusion cylinder, preferably extending elongately in a longitudinal direction. The extrusion cylinder has an inlet (preferably located at a first end) for receiving pellets of polymeric material, and an outlet (preferably located at a second end) for expelling melted polymeric material.

The extruder comprises an extruder screw preferably connected to a motor which drives it in rotation inside the extrusion cylinder to move the polymeric material from the inlet to the outlet in a feed direction. In one example embodiment, the extruder screw has a core (where the term "core" denotes the diameter measured at the base of the screw threads) which increases in size in the feed direction, so as to gradually reduce the space between the extruder screw and the extrusion cylinder itself.

The extruder also comprises a plurality of heaters coupled to the extrusion cylinder to exchange heat therewith.

The extruder according to the disclosure comprises an inspection apparatus having one or more of the features described in the foregoing.

In one example embodiment, the extruder comprises a plurality of holes made in a wall of the extrusion cylinder. Each hole is made at a measurement site. Preferably, each optical sensor can be coupled to the extrusion cylinder by insertion of the sensor into the hole.

In an example embodiment, the extrusion cylinder has a first zone, where the screw is inserted, and a second zone interposed between one end of the screw and the outlet of the extrusion cylinder. Preferably, at least one of the optical sensors of the plurality of optical sensors is coupled to the extrusion cylinder in the first zone and is configured to detect infrared light reflected by the polymeric material, and at least one of the optical sensors of the plurality of optical sensors is coupled to the extrusion cylinder in the second zone and is configured to detect infrared light transmitted by the polymeric material.

Also defined according to this description is a method for optical inspection of a mass of polymeric material passing through an extruder, where the extruder has a hollow extrusion cylinder, preferably extending elongately in a longitudinal direction. The extrusion cylinder has an inlet for receiving pellets of polymeric material, and an outlet for expelling melted polymeric material. The extruder has an extruder screw preferably connected to a motor which drives it in rotation inside the extrusion cylinder to move the polymeric material from the inlet to the outlet. The extruder also comprises heaters coupled to the extrusion cylinder.

The inspection method comprises the following steps:
  preparing a plurality of optical sensors, each having an infrared light emitter and a receiver configured to measure a measurement parameter representing an optical property of the polymeric material inside the extrusion cylinder;
  coupling the plurality of optical sensors to the extruder cylinder at a plurality of measurement sites located in succession and spaced from each other along the longitudinal direction, by inserting each optical sensor into a respective hole made in a wall of the extrusion cylinder;
  acquiring a plurality of measurement signals containing the measurement parameters measured by the corresponding optical sensors of the plurality of optical sensors;
  processing the measurement signals in order to calculate a corresponding plurality of values of a control parameter indicating a physical state of the polymeric material, where the plurality of values represents a curve of the changes in the control parameter inside the extrusion cylinder as a function of a longitudinal position.

If the step of acquiring a plurality of measurement signals lasts for a predetermined measurement time interval, the step of processing the measurement signals comprises a further step of:

calculating the control parameter, for each measurement site, as a function of a measurement parameter curve of the corresponding measurement signal in the measurement time interval.

If the receiver of the optical sensors defines a bandwidth, the method comprises the further steps of:

acquiring information relating to an infrared spectrum of the polymeric material processed by the extruder;

preparing a filter connected to each optical sensor and adjustable to selectively vary a position (in the wavelength domain) of the receiver bandwidth;

setting each optical sensor by positioning the bandwidth in a position of the infrared spectrum of the polymeric material intermediate between (two successive) absorption peaks.

BRIEF DESCRIPTION OF DRAWINGS

This and other features of the disclosure will become more apparent from the following description of a preferred embodiment of it, illustrated purely by way of example in the accompanying drawings, in which.

DETAILED DESCRIPTION OF PREFERRED EMBODIMENTS OF THE INVENTION

Figure 1:
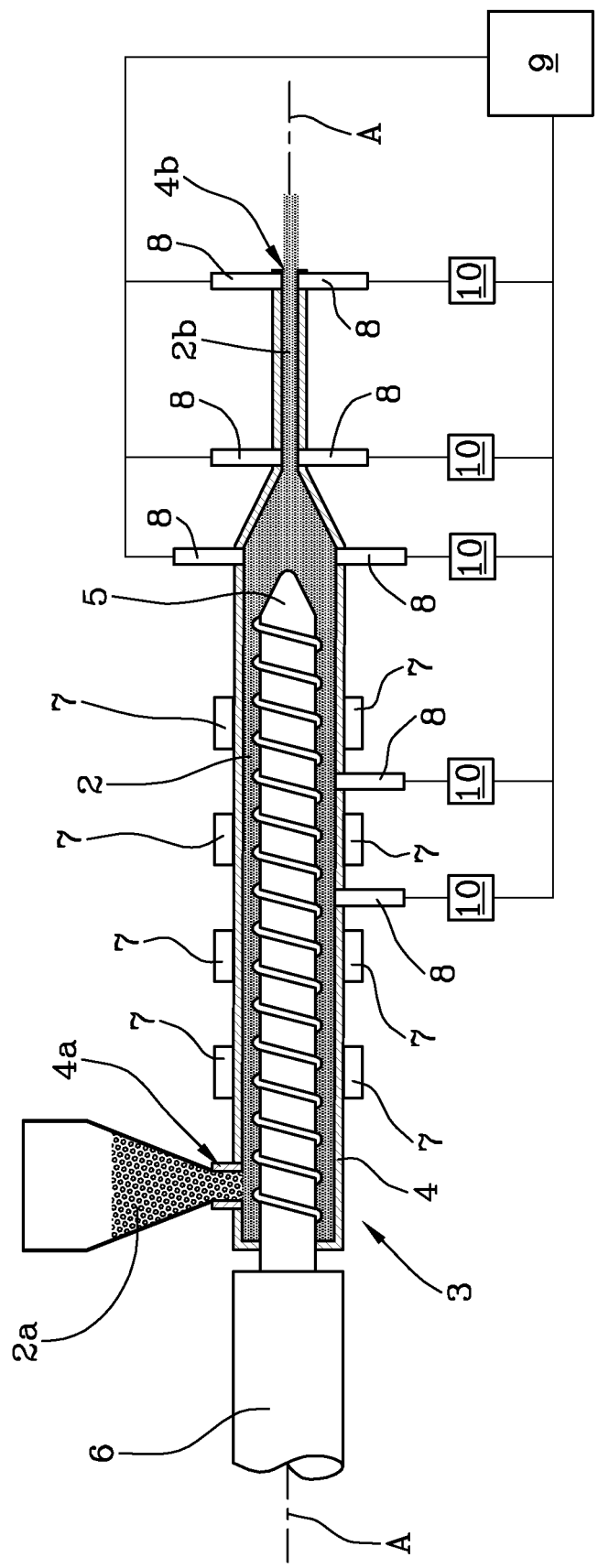
FIG. 1 shows a schematic representation of an extruder equipped with an optical inspection apparatus according to this description.
Figure 2:
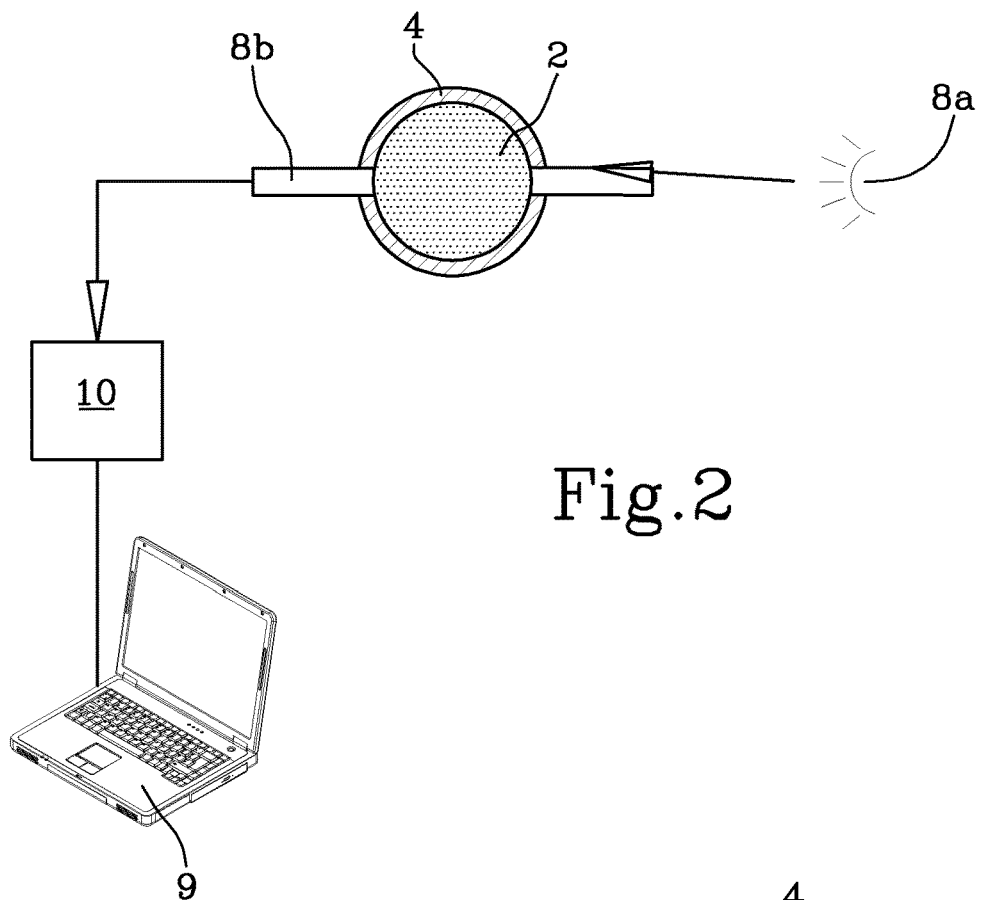
FIGS. 2 and 3 show schematic representations of a detail of the optical inspection apparatus of FIG. 1.
Figure 3:
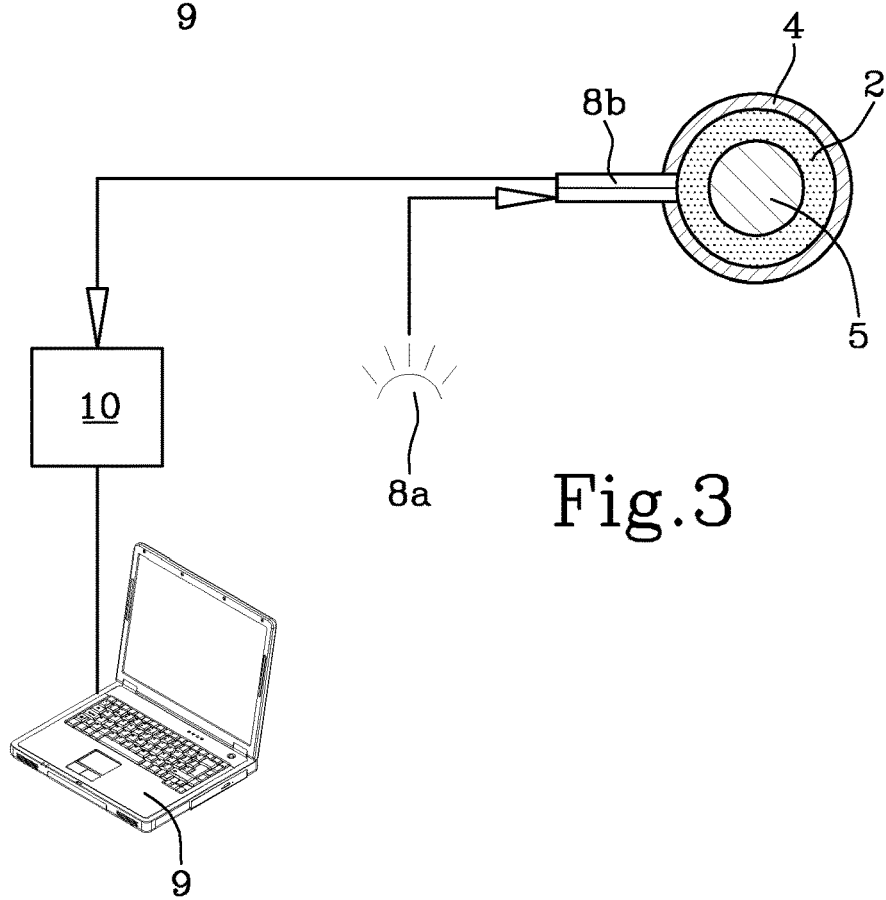

With reference to the drawings, the numeral 1 denotes an optical inspection apparatus configured to analyse a mass of polymeric material 2 passing through an extruder 3.

The extruder 3 comprises a hollow extrusion cylinder 4 extending elongately in a longitudinal direction. The extrusion cylinder 4 has an inlet 4a, preferably located at a first end, for receiving pellets 2a of polymeric material 2. The extrusion cylinder 4 has an outlet 4b, preferably located at a second end, for expelling melted polymeric material 2b.

The extruder 3 has an extruder screw 5, preferably connected to a motor 6, configured to drive it in rotation about a longitudinal axis A inside the extrusion cylinder 4 to move the polymeric material 2 from the inlet 4a to the outlet 4b.

The extruder 3 also comprises a plurality of heaters 7 coupled to the extrusion cylinder 4 to exchange heat therewith. In an example embodiment, the heaters 7 comprise electrical resistors and/or heat exchangers.

The optical inspection apparatus 1 according to the disclosure comprises a plurality of optical sensors 8 operatively coupled to the extrusion cylinder 4 in a plurality of corresponding measurement sites. The measurement sites are located in succession and spaced from each other along the longitudinal direction.

In an example embodiment, each optical sensor 8 comprises an emitter 8a and a receiver 8b configured to measure a measurement parameter representing an optical property of the polymeric material 2 passing through the extrusion cylinder 4.

Preferably, the measurement parameter represents a transmittance and/or a reflectance of the polymeric material. In other words, the measurement parameter represents an intensity of the electromagnetic radiation transmitted and/or reflected by the polymeric material 2.

Preferably, emitter 8a and receiver 8b are respectively configured to emit and detect electromagnetic waves whose wavelength is between 700 nm and 1 mm (that is, electromagnetic waves whose wavelength is in the infrared spectrum). Still more preferably, emitter 8a and receiver 8b are respectively configured to emit and detect electromagnetic waves whose wavelength is between 700 nm and 3000 nm (that is, electromagnetic waves whose wavelength is in the near-infrared spectrum).

The inspection apparatus 1 according to the disclosure also comprises a processor 9 programmed to acquire a plurality of measurement signals containing the measurement parameter measured by the corresponding optical sensors 8. In an example embodiment, the processor 9 is programmed to process the plurality of measurement signals and to calculate a corresponding plurality of values of a control parameter indicating a physical state of the polymeric material 2 inside the extrusion cylinder 4. Preferably, the plurality of control parameter values represents a curve of the control parameter as a function of a longitudinal position. In other words, the processor 9 is configured to process the measurement signals from each optical sensor 8, coupled to the extrusion cylinder 4 in the corresponding measurement site, and to generate a plurality of values of the control parameter, each of which corresponds to the value adopted by the control parameter at the longitudinal position of the respective measurement site.

In an example embodiment, the processor 9 is programmed to acquire the measurement signals for a predetermined measurement time interval (or measurement time). The processor 9 is also configured to calculate the control parameter, for each measurement site, as a function of a measurement parameter curve of the corresponding measurement signal in that measurement time.

In an example embodiment, the processor 9 is programmed to calculate a mean value and a standard deviation of the measurement parameter of the corresponding measurement signal in that measurement time.

In another example embodiment, the processor 9 is programmed to calculate the control parameter, for each measurement site, as a function of a frequency of variation of the measurement parameter of the corresponding measurement signal from a high reference interval to a low reference interval in the measurement time.

Preferably, the high reference interval is associated with the melted polymeric material and the low reference interval is associated with pellets of polymeric material.

It should be noted that the capacity of the polymeric material 2 to absorb electromagnetic radiation is influenced by the physical state of the polymeric material 2 itself. More specifically, the absorbance of the polymeric material 2 decreases during the melting process of the polymeric material.

Research and tests conducted by the Applicant showed that the mean intensity of the electromagnetic radiation detected by a receiver 8b (at a predetermined wavelength) is at its highest if the light emitted by a corresponding emitter 8a strikes the melted polymeric material 2b and at its lowest if the light emitted by the emitter 8a strikes pellets 2a of polymeric material 2.

An optical sensor 8 coupled to the extrusion cylinder 4 in a measurement site proximal to the inlet 4a of the extrusion cylinder 4 receives, in the measurement time interval, electromagnetic radiation of low mean intensity, with low variations in time, because the polymeric material 2 inspected at that measurement site consists mainly (or almost totally) of pellets 2a of polymeric material.

An optical sensor 8 coupled to the extrusion cylinder 4 in a measurement site proximal to the outlet 4b of the extrusion cylinder 4 receives, in the measurement time interval, electromagnetic radiation of high mean intensity, with limited variations in time, because the polymeric material 2 inspected at that measurement site consists mainly (or almost totally) of melted polymeric material 2b.

Research and tests conducted by the Applicant showed that an optical sensor 8 which is located at a measurement site where the polymeric material 2 is made up of pellets 2a and melted polymeric material 2b in similar percentages (for example weight or mass) receives electromagnetic radiation of intensity variable in time from the high reference interval to the low reference interval. More specifically, the frequency of variation of the measurement parameter of the corresponding measurement signal is at its highest if the polymeric material 2 consists of pellets 2a and melted polymeric material 2b in similar percentages (for example weight or mass).

In an example embodiment, the receiver 8b of the optical sensor 8 defines a bandwidth of less than 100 nm. For example, the receiver 8b is a photodiode configured to operate at a characteristic wavelength.

Preferably, the inspection apparatus 1 comprises a filter 10 for each optical sensor of the plurality of optical sensors 8. The filter 10 is connected to the optical sensor 8 and is adjustable to selectively vary a position (in the wavelength domain) of the bandwidth of the receiver 8b.

In an example embodiment, the processor 9 is configured to receive information relating to the type of polymeric material 2 processed by the extruder 3. Preferably, the processor 9 is configured to receive information relating to an infrared spectrum of the polymeric material 2 processed by the extruder 3.

It should be noted that the infrared spectrum of a polymeric material 2 typically has a plurality of absorption peaks, each associated with a characteristic wavelength of a vibrational state of the molecules of the polymeric material 2 itself. At these characteristic wavelengths, the absorbance of the polymeric material 2 is considerably increased. An electromagnetic radiation intensity detected by the receiver 8b at these characteristic wavelengths may be much lower than an electromagnetic radiation intensity detected at a wavelength intermediate between characteristic wavelengths and requires very sensitive, expensive optical sensors to be detected.

In an example embodiment, the processor 9 is connected to the filter 10 in order to adjust it and is programmed to set, for each optical sensor 8, the position (in the wavelength domain) of the bandwidth in a zone of the infrared spectrum intermediate between (two successive) absorption peaks.

Preferably, the processor 9 is connected to each filter 10 in order to adjust it and is programmed to set, for each optical sensor 8, the position (in the wavelength domain) of the bandwidth in a zone of the infrared spectrum intermediate between (two successive) consecutive absorption peaks.

In an example embodiment, the apparatus 1 comprises a scattering spectrophotometer or a Fourier transform spectrophotometer configured to detect an infrared spectrum of the polymeric material 2. Preferably, the scattering spectrophotometer or the Fourier transform spectrophotometer is configured to operate in a wavelength interval between 700 nm and 3000 nm (that is, to operate in the near-infrared spectrum).

Preferably, the scattering spectrophotometer (or the Fourier transform spectrophotometer) is connected to the processor 9 to transmit information relating to the polymeric material 2 (that is, the information relating to the infrared spectrum of the polymeric material 2) processed by the extruder 3. Preferably, the processor 9 is connected to the filter 10 in order to set, for each optical sensor, the position (in the wavelength domain) of the bandwidth as a function of the information relating to the information relating to the infrared spectrum of the polymeric material 2.

In an example embodiment, the processor 9 is set up to receive operating parameters relating to the rotation speed of the extruder screw 5 and/or the heating power of the heaters 7 and/or the pressure inside the extrusion cylinder 4. Preferably, the processor 9 is programmed to generate one or more control signals as a function of the curve of the control parameter relative to the longitudinal position. These are feedback control signals for varying the operating parameters as a function of a reference configuration (that is, a reference curve) of the control parameter as a function of the longitudinal position.

In an example embodiment, the processor 9 is connected to the motor 6 of the extruder screw 5 to receive operating parameters representing the rotation speed of the extruder screw 5 and to transmit a first control signal to vary the rotation speed.

In a further example embodiment, the processor 9 is connected to the heaters 7 to receive operating parameters representing the power exchanged between the heaters 7 and the extrusion cylinder 4 and to transmit a second, feedback control signal, preferably as a function of the longitudinal position.

In a further example embodiment, the processor 9 is connected to at least one pressure transducer to receive operating parameters representing a value of the pressure inside the extrusion cylinder 4 and to transmit a third, feedback control signal to vary the pressure inside the extrusion cylinder 4.

A further aim of this description is to provide an extruder 3 for polymeric materials 2. The extruder 3 comprises a hollow extrusion cylinder 4, preferably extending elongately in a longitudinal direction. The extrusion cylinder 4 has an inlet 4a (preferably located at a first end) for receiving pellets 2a of polymeric material 2, and an outlet 4b (preferably located at a second end) for expelling melted polymeric material 2b.

The extruder 3 comprises an extruder screw 5 connected to a motor 6 for driving it in rotation about a longitudinal axis A inside the extrusion cylinder 4 and to move the polymeric material 2 from the inlet 4a to the outlet 4b.

The extruder 3 comprises an extruder screw 5 configured to rotate about a longitudinal axis A inside the extrusion cylinder 4 to move the polymeric material 2 from the inlet 4a to the outlet 4b in a feed direction. Preferably, the extruder screw 5 is connected to a motor 6 to rotate about the longitudinal axis A. In an example embodiment, the extruder screw 5 has a core (where the term "core" denotes the diameter measured at the base of the screw threads) which increases in size in the feed direction, so as to gradually reduce the space between the extruder screw 5 itself and the extrusion cylinder 4.

The extruder 3 also comprises a plurality of heaters 7 coupled to the extrusion cylinder 4 to exchange heat therewith.

The extruder 3 according to the disclosure comprises an inspection apparatus 1 having one or more of the features described in the foregoing.

In one example embodiment, the extruder 3 comprises a plurality of holes made in a wall of the extrusion cylinder 4. Each hole is made at a measurement site. Preferably, each optical sensor 8 can be coupled to the extrusion cylinder 4 by insertion of the sensor 8 into the hole.

In an example embodiment, the extrusion cylinder 4 has a first zone, where the extruder screw 5 is inserted, and a second zone interposed between one end of the extruder screw 5 and the outlet 4b of the extrusion cylinder 4. Preferably, at least one of the optical sensors 8 of the plurality of optical sensors 8 is coupled to the extrusion cylinder 4 in the first zone and is configured to detect infrared light reflected by the polymeric material 2, and at least one of the optical sensors 8 of the plurality of optical sensors 8 is coupled to the extrusion cylinder 4 in the second zone and is configured to detect infrared light transmitted by the polymeric material 2.

Also defined according to this description is a method for optical inspection of a mass of polymeric material 2 passing through an extruder 3. The extruder 3 has a hollow extrusion cylinder 4 extending elongately in a longitudinal direction. The extrusion cylinder 4 has an inlet 4a for receiving pellets 2a of polymeric material 2, and an outlet 4b for expelling melted polymeric material 2b. The extruder 3 has an extruder screw 5 (preferably connected to a motor 6) configured to rotate inside the extrusion cylinder 4 and to move the polymeric material 2 from the inlet 4a to the outlet 4b. The extruder 3 also comprises heaters 7 coupled to the extrusion cylinder 4.

The inspection method comprises the following steps:

preparing a plurality of optical sensors 8, each having an infrared light emitter 8a and a receiver 8b configured to measure a measurement parameter representing an optical property of the polymeric material 2 inside the extrusion cylinder 4;

coupling the plurality of optical sensors 8 to the extrusion cylinder 4 at a plurality of measurement sites located in succession and spaced from each other along the longitudinal direction, by inserting each optical sensor 8 into a respective hole made in a wall of the extrusion cylinder 4;

acquiring a plurality of measurement signals containing the measurement parameters measured by the corresponding optical sensors 8 of the plurality of optical sensors 8;

processing the measurement signals in order to calculate a corresponding plurality of values of a control parameter indicating a physical state of the polymeric material 2, where the plurality of values represents a curve of the changes in the control parameter inside the extrusion cylinder 4 as a function of a longitudinal position.

If the step of acquiring a plurality of measurement signals lasts for a predetermined measurement time, the step of processing the measurement signals comprises a further step of:

calculating the control parameter, for each measurement site, as a function of a measurement parameter curve of the corresponding measurement signal in the measurement time interval.

If the receiver 8b of the optical sensors 8 defines a bandwidth, the method comprises the further steps of:

acquiring information relating to an infrared spectrum of the polymeric material 2 processed by the extruder 3;

preparing a filter 10 connected to each optical sensor 8 and adjustable to selectively vary a position (in the wavelength domain) of the bandwidth of the receiver 8b;

setting each optical sensor 8 by positioning the bandwidth in a position of the infrared spectrum of the polymeric material 2 intermediate between (two successive) absorption peaks.

The invention claimed is:

1. An apparatus for optical inspection of a mass of polymeric material passing through an extruder, wherein the extruder has:

a hollow extrusion cylinder, elongated in a longitudinal direction and having an inlet for receiving pellets of polymeric material, and an outlet for expelling melted polymeric material;

an extruder screw connected to a motor to rotate inside the extrusion cylinder and to move the polymeric material from the inlet to the outlet;

heaters coupled to the extrusion cylinder, wherein the optical inspection apparatus comprises an optical sensor which is operatively coupled to the extrusion cylinder and which has an infrared light emitter and a receiver configured to measure a measurement parameter representing an optical property of the polymeric material inside the extrusion cylinder, wherein the optical inspection apparatus comprises:

a plurality of the optical sensors, which are operatively coupled to the extrusion cylinder in a plurality of measurement sites located in succession and spaced from each other along the longitudinal direction, and which are configured to measure corresponding measurement parameters representing properties of the polymeric material passing through the extrusion cylinder at said plurality of measurement sites located in succession and spaced from each other along the longitudinal direction;

a plurality of windows made in a wall of the extrusion cylinder at said plurality of measurement sites, wherein each optical sensor is inserted into a corresponding window of the plurality of windows;

a processor programmed to acquire a plurality of measurement signals containing the measurement parameters measured by the corresponding optical sensors of the plurality of optical sensors and programmed to process the plurality of measurement signals in order to calculate a corresponding plurality of values of a control parameter indicating a physical state of the polymeric material, wherein the plurality of values represents a curve of the changes in the control parameter inside the extrusion cylinder as a function of a longitudinal position.

2. The apparatus according to claim 1, wherein the processor is programmed to acquire the measurement signals for a measurement time interval and to calculate the control parameter, for each measurement site, as a function of a measurement parameter curve of the corresponding measurement signal in the measurement time interval.

3. The apparatus according to claim 2, wherein the measurement parameters represent a transmittance and/or a reflectance of the plastic material and wherein the processor is programmed to calculate the control parameter, for each measurement site, as a function of a frequency of variation of a measurement parameter of the corresponding measurement signal from a high reference interval to a low reference interval.

4. The apparatus according to claim 2, wherein the processor is programmed to calculate the control parameter, for each measurement site, as a function of a mean value of a measurement parameter of the corresponding measurement signal in the measurement time interval.

5. The apparatus according to claim 1, wherein the receiver of the optical sensors defines a bandwidth of less than 100 nm.

6. The apparatus according to claim 1, comprising, for each of the plurality of optical sensors, a filter connected to the optical sensor and adjustable to selectively vary a position of the bandwidth of the receiver.

7. The apparatus according to claim 6, wherein the processor is configured to receive information relating to the polymeric material processed by the extruder, is connected to the filters to adjust them and is programmed to set for each optical sensor, the position of the bandwidth in a zone of an infrared spectrum of the polymeric material intermediate between absorption peaks.

8. The apparatus according to claim 7, comprising a scattering spectrophotometer or a Fourier transform spectrophotometer, connected to the processor to transmit the information relating to the polymeric material processed by the extruder.

9. The apparatus according to claim 1, wherein the processor is set up to receive one or more of the operating parameters listed below:
   rotation speed of the extruder screw,
   heating power of the heaters,
   pressure inside the extrusion cylinder,
and is programmed to generate one or more feedback control signals as a function of the curve of the changes in the control parameter inside the extrusion cylinder in order to vary the one or more operating parameters as a function of the curve of the changes in the control parameter inside the extrusion cylinder.

10. The apparatus according to claim 1, wherein the optical sensors are configured to emit and/or detect infrared light having a wavelength between 700 nm and 1 mm.

11. The apparatus according to claim 1, wherein the extrusion cylinder has a first zone, where the extruder screw is inserted, and a second zone, interposed between one end of the extruder screw and the outlet, and wherein
   at least one of the optical sensors of the plurality of optical sensors is coupled to the extrusion cylinder in the first zone and is configured to detect infrared light reflected by the polymeric material, and
   at least one of the optical sensors of the plurality of optical sensors is coupled to the extrusion cylinder in the second zone and is configured to detect infrared light transmitted by the polymeric material.

12. An apparatus for optical inspection of a mass of polymeric material passing through an extruder, wherein the extruder has:
   a hollow extrusion cylinder, elongated in a longitudinal direction and having an inlet for receiving pellets of polymeric material, and an outlet for expelling melted polymeric material;
   an extruder screw connected to a motor to rotate inside the extrusion cylinder and to move the polymeric material from the inlet to the outlet;
   heaters coupled to the extrusion cylinder,
wherein the optical inspection apparatus comprises an optical sensor which is operatively coupled to the extrusion cylinder and which has an infrared light emitter and a receiver configured to measure a measurement parameter representing a property of the polymeric material inside the extrusion cylinder,
wherein the optical inspection apparatus comprises:
   a plurality of the optical sensors, which are operatively coupled to the extrusion cylinder in a plurality of measurement sites located in succession and spaced from each other along the longitudinal direction;
   a processor programmed to acquire a plurality of measurement signals containing the measurement parameters measured by the corresponding optical sensors of the plurality of optical sensors and programmed to process the plurality of measurement signals in order to calculate a corresponding plurality of values of a control parameter indicating a physical state of the polymeric material, wherein the plurality of values represents a curve of the changes in the control parameter inside the extrusion cylinder as a function of a longitudinal position;
   for each of the plurality of optical sensors, a filter connected to the optical sensor and adjustable to selectively vary a position of the bandwidth of the receiver, wherein the processor is configured to receive information relating to the polymeric material processed by the extruder, is connected to the filters to adjust them and is programmed to set for each optical sensor, the position of the bandwidth in a zone of an infrared spectrum of the polymeric material intermediate between absorption peaks.

* * * * *